United States Patent
Onogi

(10) Patent No.: US 12,221,386 B2
(45) Date of Patent: Feb. 11, 2025

(54) METHOD FOR DEGREASING SHAPED CERAMIC MOLDED BODY AND METHOD FOR MANUFACTURING CERAMIC FIRED BODY

(71) Applicant: NGK INSULATORS, LTD., Nagoya (JP)

(72) Inventor: Tetsuya Onogi, Niwa-Gun (JP)

(73) Assignee: NGK INSULATORS, LTD., Nagoya (JP)

( * ) Notice: Subject to any disclaimer, the term of this patent is extended or adjusted under 35 U.S.C. 154(b) by 1171 days.

(21) Appl. No.: 17/005,781

(22) Filed: Aug. 28, 2020

(65) Prior Publication Data
US 2020/0392047 A1    Dec. 17, 2020

Related U.S. Application Data

(63) Continuation of application No. PCT/JP2019/006307, filed on Feb. 20, 2019.

(30) Foreign Application Priority Data

Mar. 1, 2018 (JP) .................... 2018-036703

(51) Int. Cl.
| | |
|---|---|
| C04B 35/632 | (2006.01) |
| B22F 1/10 | (2022.01) |
| C04B 35/638 | (2006.01) |
| C04B 35/64 | (2006.01) |

(52) U.S. Cl.
CPC .............. *C04B 35/632* (2013.01); *B22F 1/10* (2022.01); *C04B 35/638* (2013.01); *C04B 35/64* (2013.01); *C04B 2235/6562* (2013.01); *C04B 2235/6582* (2013.01)

(58) Field of Classification Search
CPC ........................ C04B 35/64; C04B 2235/6582
See application file for complete search history.

(56) References Cited

U.S. PATENT DOCUMENTS

2012/0104665 A1* 5/2012 ter Maat ............... C04B 35/638
264/234

FOREIGN PATENT DOCUMENTS

| CN | 1156706 A | 8/1997 |
|---|---|---|
| JP | S61-201673 A1 | 9/1986 |
| JP | H03-257101 A1 | 11/1991 |
| JP | H07-187805 A1 | 7/1995 |

(Continued)

OTHER PUBLICATIONS

Machine translation KR890002445B1 (Year: 1989).*

(Continued)

*Primary Examiner* — Jacob T Minskey
*Assistant Examiner* — Wayne K. Swier
(74) *Attorney, Agent, or Firm* — BURR PATENT LAW, PLLC

(57) ABSTRACT

A ceramic molded body including a ceramic powder and an organic binder includes an oxidizable ceramic powder as the ceramic powder, includes an oxidizable metal or metal compound, or is in contact with a solid body including an oxidizable metal or metal compound. In a hydrogen atmosphere, the ceramic molded body is heated to a maximum temperature set within a range of 1,100° C. to 1,400° C. at a heating rate of more than 25° C./h, is degreased at the maximum temperature, and is then cooled at a cooling rate of more than 25° C./h.

12 Claims, 4 Drawing Sheets

(56) References Cited

FOREIGN PATENT DOCUMENTS

| JP | 09188569 A | * | 7/1997 | |
| JP | H09-188569 A1 | | 7/1997 | |
| JP | 2003-124054 A1 | | 4/2003 | |
| JP | 2004002130 A | * | 1/2004 | ............ B22F 1/0059 |
| JP | 2006-344810 A1 | | 12/2006 | |
| JP | 5108589 B2 | * | 12/2012 | |
| JP | 2016-166123 A1 | | 9/2016 | |
| JP | 2017119592 A | * | 7/2017 | |
| KR | 89-002445 B1 | * | 7/1989 | ............... H01G 4/12 |
| WO | WO-9818586 A1 | * | 5/1998 | ............ B22F 1/0059 |
| WO | WO-2012056922 A1 | * | 5/2012 | ......... C04B 35/4682 |

OTHER PUBLICATIONS

Machine translation JP2004002130A (Year: 2004).*
New machine translation KR890002445 (B1) also published as KR870005416 (A) (Year: 1985).*
Machine translation JPH09188569A (Year: 1997).*
Machine translation WO9818586A1 (Year: 1998).*
Machine translation WO2012056922A1 (Year: 2012).*
Machine translation JP5108589B2 (Year: 2012).*
Machine translation JP2017119592A (Year: 2017).*
English translation of the International Preliminary Report on Patentability (Chapter I) (Application No. PCT/JP2019/006307) dated Sep. 10, 2020.
Chinese Office Action (Application No. 201980006150.4) dated Sep. 23, 2021 (with English translation).
Ho Hongyuan et al., "Fundamentals of Material Forming Technology," Chapter 5, Southeast University Press, Aug. 31, 2000, pp. 170-171.
International Search Report and Written Opinion (Application No. PCT/JP2019/006307) dated Apr. 9, 2019.
Huang Zhongliang, *Ultra-Precision Engineering of New Ceramics*, Examples of Ultra-Precision Machining, Tainan Fuhan Publishing House, Taiwan Province, China, Aug. 31, 1983, p. 210.
Chinese Office Action (Application No. 201980006150.4) dated Aug. 25, 2022 (with English translation).

* cited by examiner

METHOD FOR DEGREASING SHAPED CERAMIC MOLDED BODY AND METHOD FOR MANUFACTURING CERAMIC FIRED BODY

BACKGROUND OF THE INVENTION

1. Field of the Invention

The present invention relates to methods for degreasing shaped ceramic bodies and methods for manufacturing fired ceramic bodies.

2. Description of the Related Art

As methods for degreasing shaped ceramic bodies, there are known methods in which a ceramic molded body obtained by shaping a slurry containing a ceramic powder, an organic binder, and a dispersion medium and having a predetermined shape is degreased by heat treatment. For example, PTL 1 states that the time required to complete degreasing can be sufficiently shortened by heat-treating a ceramic molded body in superheated steam containing oxygen gas at a predetermined oxygen gas partial pressure. However, if the ceramic molded body contains an oxidizable substance (e.g., aluminum nitride or Ni), this degreasing method may fail to provide the target physical properties because the oxidizable substance is oxidized by the superheated steam.

On the other hand, PTL 2 discloses a method in which a stack of shaped ceramic bodies including a ceramic raw material and an organic binder and internal electrodes containing Ni as a main component is degreased by heating from room temperature to a temperature of 1,300° C. in nitrogen gas. This method can prevent the stack from being oxidized because the stack is degreased in nitrogen gas.

CITATION LIST

Patent Literature

PTL 1: Japanese Unexamined Patent Application Publication No. 2016-166123
PTL 2: Japanese Unexamined Patent Application Publication No. 2003-124054

SUMMARY OF THE INVENTION

However, in PTL 2, the heating rate from 20° C. to 400° C. is set to 25° C./h or less to inhibit the cracking of the stack after degreasing. Thus, a problem arises in that degreasing requires a long period of time.

The present invention has been made to solve the foregoing problem. A primary object of the present invention is to reliably degrease a ceramic molded body within a short period of time while preventing the ceramic molded body from cracking and to prevent the ceramic molded body and/or a solid body in contact with the ceramic molded body from being oxidized during the degreasing treatment.

A method for degreasing a ceramic molded body according to the present invention is
   a method for degreasing a ceramic molded body, including degreasing a ceramic molded body including a ceramic powder and an organic binder,
      wherein the ceramic molded body includes an oxidizable ceramic powder as the ceramic powder, includes an oxidizable metal or metal compound, or is in contact with a solid body including an oxidizable metal or metal compound, and
      in an atmosphere of hydrogen gas alone or in an atmosphere of a mixture of an inert gas and hydrogen gas with a hydrogen gas concentration of 20% by volume or more, the ceramic molded body is heated to a maximum temperature set within a range of 1,100° C. to 1,400° C. at a heating rate of more than 25° C./h, is degreased at the maximum temperature, and is then cooled at a cooling rate of more than 25° C./h.

Another method for degreasing a ceramic molded body according to the present invention is
   a method for degreasing a ceramic molded body, including degreasing a ceramic molded body including a ceramic powder and an organic binder,
      wherein the ceramic molded body includes an oxidizable ceramic powder as the ceramic powder, includes an oxidizable metal or metal compound, or is in contact with a solid body including an oxidizable metal or metal compound, and
      in an atmosphere of hydrogen gas alone or in an atmosphere of a mixture of an inert gas and hydrogen gas with a hydrogen gas concentration of 20% by volume or more, the ceramic molded body is heated to an intermediate temperature set within a range of 600° C. to 1,100° C. at a heating rate of more than 25° C./h, is held at the intermediate temperature for a predetermined period of time, is heated to a maximum temperature set above the intermediate temperature within a range of 1,100° C. to 1,400° C. at a heating rate of more than 25° C./h, is degreased at the maximum temperature, and is then cooled at a cooling rate of more than 25° C./h.

A method for manufacturing a ceramic fired body according to the present invention is
   a method for manufacturing a ceramic fired body, including:
      a degreasing step of degreasing a ceramic molded body including a ceramic powder and an organic binder; and
      a firing step of firing the degreased ceramic molded body,
      wherein the above-described method for degreasing a ceramic molded body is employed in the degreasing step.

Because the method for degreasing a ceramic molded body according to the present invention includes treating a ceramic molded body in an atmosphere containing a suitable amount of hydrogen gas, it is possible to prevent the ceramic molded body and/or a solid body in contact with the ceramic molded body from being oxidized during the degreasing treatment. In addition, hydrogen gas has good thermal conductivity and high diffusivity and thus causes a smaller temperature variation in the ceramic molded body during heating and cooling. Therefore, the ceramic molded body is less likely to crack even if the heating and cooling rates are set to more than 25° C./h to perform degreasing within a short period of time. Furthermore, because the ceramic molded body is degreased at the maximum temperature set within a range of 1,100° C. to 1,400° C., the ceramic molded body can be reliably degreased. It is believed that carbon generated from the organic binder is removed from the ceramic molded body, for example, by the reaction $C+2H_2 \rightarrow CH_4$. As described above, the degreasing method according to the present invention makes it possible to reliably degrease a ceramic molded body within a short period of time while preventing the ceramic molded body from cracking and to prevent the ceramic molded body and/or a solid body in contact with the ceramic molded body from being oxidized during the degreasing treatment.

In addition, if the ceramic molded body is thick, it is preferred that the ceramic molded body be heated to an intermediate temperature set within a range of 600° C. to 1,100° C. at a heating rate of more than 25° C./h and be held at the intermediate temperature for a predetermined period of time before being degreased at the maximum temperature set within a range of 1,100° C. to 1,400° C. This allows the ceramic molded body to be more reliably degreased and the time from the start of heating to the end of cooling to be shortened as compared to a method in which the ceramic molded body is not held at the intermediate temperature for a predetermined period of time.

DETAILED DESCRIPTION OF THE INVENTION

Figure 1:
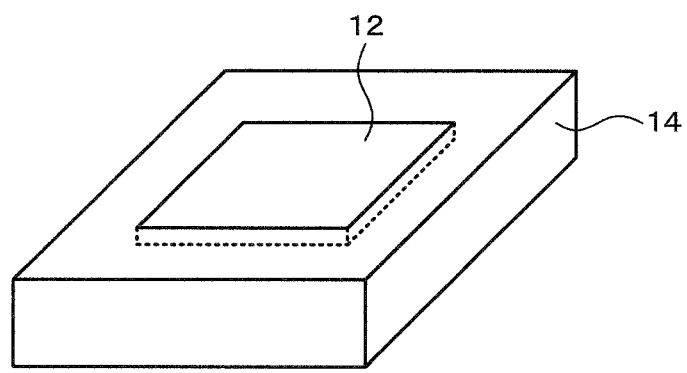
FIG. 1 is an illustration of an example form in which a solid body 12 is embedded in a shaped body 14.

An embodiment of a method for degreasing a ceramic molded body according to the present invention will hereinafter be described. It should be understood that the method for degreasing a ceramic molded body according to the invention is not limited to the following embodiment in any way, but can be practiced in various embodiments within the technical scope of the invention.

The method for degreasing a ceramic molded body according to this embodiment is a method for degreasing a ceramic molded body including a ceramic powder and an organic binder. The ceramic molded body includes an oxidizable ceramic powder as the ceramic powder, includes an oxidizable metal or metal compound, or is in contact with a solid body including an oxidizable metal or metal compound. In the degreasing method according to this embodiment, in a hydrogen atmosphere, the ceramic molded body is heated to a maximum temperature set within a range of 1,100° C. to 1,400° C. at a heating rate of more than 25° C./h, is degreased at the maximum temperature, and is then cooled at a cooling rate of more than 25° C./h. Alternatively, in a hydrogen atmosphere, the ceramic molded body is heated to an intermediate temperature set within a range of 600° C. to 1,100° C. at a heating rate of more than 25° C./h, is held at the intermediate temperature for a predetermined period of time, is heated to a maximum temperature set above the intermediate temperature within a range of 1,100° C. to 1,400° C. at a heating rate of more than 25° C./h, is degreased at the maximum temperature, and is then cooled at a cooling rate of more than 25° C./h.

The ceramic molded body may be formed by shaping a slurry containing a ceramic powder, an organic binder, and a dispersion medium into a predetermined shape and then drying the shaped body, or may be formed by mixing raw material powders including a ceramic powder and a solid organic binder in a dry state and then shaping the mixture into a predetermined shape. The porosity of the ceramic molded body is preferably, but not limited to, 20% by volume to 70% by volume. If the porosity falls within this range, hydrogen gas easily passes through the ceramic molded body. Thus, the degreasing of the ceramic molded body is completed within a shorter period of time. If the porosity falls below 20% by volume, hydrogen gas does not easily pass through the ceramic molded body. Thus, degreasing may require a rather long period of time, and the ceramic molded body may be damaged because of an increase in internal pressure due to the decomposition gas. If the porosity exceeds 70% by volume, the ceramic molded body may be difficult to handle because of its decreased strength. When a ceramic molded body obtained by shaping a slurry is dried, voids (open pores) are formed in the ceramic molded body; the porosity is calculated based on those voids. The thickness of the ceramic molded body is preferably, but not limited to, 3 mm to 30 mm, more preferably 15 mm to less than 30 mm, if a method in which the ceramic molded body is held at the intermediate temperature is selected as the method for degreasing a ceramic molded body. If the ceramic molded body is thin, degreasing proceeds sufficiently even if the ceramic molded body is not held at the intermediate temperature. Thus, if a method in which the ceramic molded body is not held at the intermediate temperature is selected as the method for degreasing a ceramic molded body, the thickness of the ceramic molded body is preferably 3 mm to less than 15 mm.

The ceramic powder may be either an oxide-based ceramic powder or a non-oxide-based ceramic powder. Examples of ceramic powders include alumina, yttria, aluminum nitride, silicon nitride, silicon carbide, samaria, magnesia, magnesium fluoride, and ytterbium oxide powders. These powders may be used alone or in a combination of two or more thereof. The oxidizable ceramic powder is a ceramic powder that can be oxidized. Examples of oxidizable ceramic powders include aluminum nitride, silicon nitride, and silicon carbide.

Examples of organic binders include urethane resins, vinyl butyral-based resins, vinyl alcohol-based resins, vinyl acetal-based resins, vinyl formal-based resins, polyimide resins, phenolic resins, melamine resins, epoxy resins, coumarone-indene resins, acrylic resins, aromatic vinyl resins, maleic acid-based resins, cellulose and cellulose derivatives, gelatin and gelatin derivatives, waxes, and starch. The amount of organic binder used is, for example, but not limited to, 1 part by mass to 30 parts by mass, preferably 3 parts by mass to 20 parts by mass, based on 100 parts by mass of the ceramic powder.

A gelling agent can be used as the organic binder. The gelling agent may include, for example, an isocyanate, a polyol, and a catalyst. Of these, the isocyanate may be any substance that has an isocyanate group as a functional group. Examples of isocyanates include tolylene diisocyanate (TDI), diphenylmethane diisocyanate (MDI), and modified derivatives thereof. The isocyanate may contain a reactive functional group other than an isocyanate group in the molecule thereof. Furthermore, like polyisocyanates, the isocyanate may contain numerous reactive functional groups. The polyol may be any substance that has two or more hydroxy groups reactive with isocyanate groups. Examples of polyols include ethylene glycol (EG), polyethylene glycol (PEG), propylene glycol (PG), polypropylene glycol (PPG), polytetramethylene glycol (PTMG), polyhexamethylene glycol (PHMG), and polyvinyl alcohol (PVA). The catalyst may be any substance that facilitates a urethane reaction between the isocyanate and the polyol. Examples of catalysts include triethylenediamine, hexanediamine, and 6-dimethylamino-1-hexanol. If a gelling agent including an isocyanate, a polyol, and a catalyst is used, the gelling agent undergoes a gelling reaction to form a urethane resin. This urethane resin functions as the organic binder.

Examples of dispersion media include water, alcohols, ketones, esters, ethers, aromatic hydrocarbons, and polybasic acids. Examples of alcohols include isopropanol, 1-butanol, ethanol, 2-ethylhexanol, terpineol, ethylene glycol, and glycerol. Examples of ketones include acetone and methyl ethyl ketone. Examples of esters include butyl acetate, dimethyl glutarate, and triacetin. Examples of ethers include ethylene glycol monoethyl ether, butyl carbitol, and butyl carbitol acetate. Examples of aromatic hydrocarbons include toluene, xylene, and solvent naphtha. Examples of polybasic acids include glutaric acid. If a gelling agent is used as the organic binder, a mixture of a polybasic acid ester (e.g., dimethyl glutarate) and an aliphatic polyvalent ester (e.g., triacetin) is preferably used as the dispersion medium.

If the ceramic molded body is fabricated by shaping a slurry containing the ceramic powder, the organic binder, and the dispersion medium into a predetermined shape, other materials such as a dispersant and a plasticizer may be added to the slurry. The dispersant may be any dispersant capable of uniformly dispersing the ceramic powder in the solvent. Examples of dispersants include anionic, cationic, and nonionic surfactants. Specific examples include polycarboxylic acid-based copolymers, polycarboxylic acid salts, sorbitan fatty acid esters, polyglycerol fatty acid esters, phosphoric acid ester salt-based copolymers, sulfonic acid salt-based copolymers, and polyurethane polyester-based copolymers having a tertiary amine. Examples of plasticizers include phthalic acid-based plasticizers, glycol-based plasticizers, and adipic acid-based plasticizers. Examples of methods for shaping the slurry into a ceramic molded body having a predetermined shape include tape casting, extrusion molding, slip casting, injection molding, and uniaxial press molding. These shaping methods are conventionally known methods.

Figure 2:
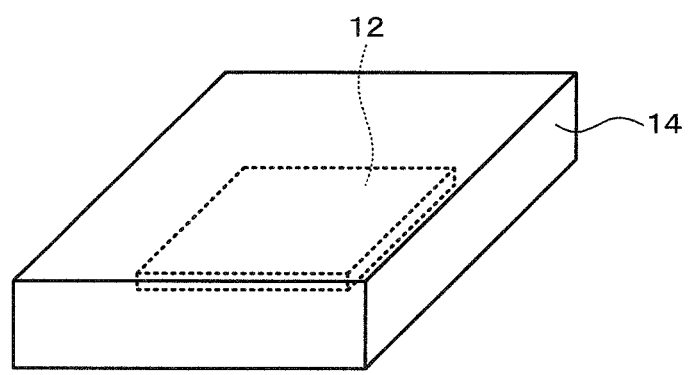
FIG. 2 is an illustration of an example form in which the solid body 12 is embedded in the shaped body 14.
Figure 3:
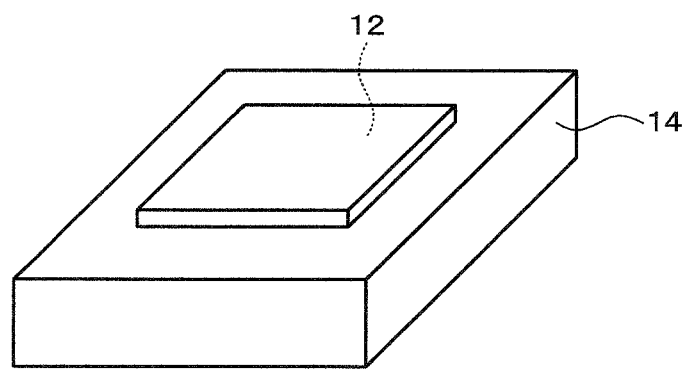
FIG. 3 is an illustration of an example form in which the solid body 12 is disposed on the shaped body 14.

The oxidizable metal may be any metal that can be oxidized and that does not melt at the maximum temperature during degreasing. Examples of oxidizable metals include Ni, Mo, and W. Examples of oxidizable metal compounds include MoC and WC. The oxidizable metal or metal compound may be dispersed in the ceramic molded body. Alternatively, a solid body (e.g., a plate-shaped body, a wire-shaped body, or a block-shaped body) of the oxidizable metal or metal compound may be disposed in contact with the shaped body. Examples of forms in which the solid body is in contact with the shaped body include forms in which a solid body 12 is embedded in a shaped body 14, as shown in FIGS. 1 and 2 (in FIG. 1, the solid body 12 is embedded in the shaped body 14 with one surface thereof exposed to the outside, and in FIG. 2, the solid body 12 is completely embedded in the shaped body 14), and forms in which the solid body 12 is disposed on the shaped body 14, as shown in FIG. 3.

In the method for degreasing a ceramic molded body according to this embodiment, the hydrogen atmosphere is an atmosphere of hydrogen gas alone or an atmosphere of a mixture of an inert gas and hydrogen gas with a hydrogen gas concentration of 20% by volume or more. Examples of inert gases include nitrogen gas and argon gas. In view of cost, nitrogen gas is preferred. The hydrogen atmosphere may contain trace amounts of impurity gases incidentally present therein (e.g., oxygen gas). The ceramic molded body and/or the solid body in contact with the ceramic molded body undergoes substantially no oxidation during the degreasing treatment because the treatment is performed in the hydrogen atmosphere described above. In addition, hydrogen gas has good thermal conductivity and high diffusivity and thus causes a smaller temperature difference throughout the ceramic molded body during heating and cooling. Therefore, the ceramic molded body is less likely to crack even if the heating and cooling rates are set to more than 25° C./h to perform degreasing within a short period of time. If the hydrogen gas concentration of the hydrogen atmosphere falls below 20% by volume, the effect of the hydrogen gas is no longer achieved. To perform degreasing within a shorter period of time, it is preferred to set the heating and cooling rates to 50° C./h or more. In view of the capability of the furnace, it is preferred to set the heating and cooling rates to 500° C./h or less. That is, it is preferred to set the heating and cooling rates to 50° C./h to 500° C./h. To avoid the possibility of the ceramic molded body cracking due to a difference in thermal expansion, it is preferred to set the heating and cooling rates to 300° C./h or less.

In the method for degreasing a ceramic molded body according to this embodiment, the maximum temperature is set within a range of 1,100° C. to 1,400° C. Because the ceramic molded body is heated at such a relatively high temperature, the ceramic molded body can be reliably degreased. It is believed that carbon generated from the organic binder is removed from the ceramic molded body, for example, by the reaction $C+2H_2 \rightarrow CH_4$. Maximum temperatures below 1,100° C. are not preferred because such temperatures make it difficult to sufficiently degrease the ceramic molded body and thus increase the residual carbon content of the ceramic molded body. Maximum temperatures above 1,400° C. are not preferred because the ceramic molded body may be partially sintered at such temperatures. The ceramic molded body is degreased at the maximum temperature by holding the ceramic molded body at the maximum temperature for a predetermined period of time. Although the holding time at the maximum temperature may be set as appropriate by conducting a preliminary experiment in advance, the holding time is preferably set to 1 hour or more. This is because a holding time of 1 hour or more results in sufficient degreasing.

Before the ceramic molded body is degreased at the maximum temperature set within a range of 1,100° C. to 1,400° C., the ceramic molded body may be heated to an intermediate temperature set within a range of 600° C. to 1,100° C. (preferably 700° C. to 1,000° C.) at a heating rate of more than 25° C./h and may then be held at the intermediate temperature for a predetermined period of time. The maximum temperature is set above the intermediate temperature. This method is effective for thick shaped ceramic bodies. If the ceramic molded body is not held at the intermediate temperature, a thicker ceramic molded body needs to be held at the maximum temperature for a longer period of time to sufficiently degrease (remove residual carbon from) the ceramic molded body to the center thereof. In contrast, if the ceramic molded body is held at the intermediate temperature, the ceramic molded body can be sufficiently degreased even if the ceramic molded body is held at the maximum temperature for a short period of time. Although the reason is not fully understood, it is presumed to be as follows. The methanation reaction $C+2H_2 \rightarrow CH_4$ proceeds in a temperature range of 600° C. to 1,400° C. (particularly 700° C. to 1,400° C.). Of this temperature range, amorphous carbon derived from the resin backbone is assumed to be predominant in the lower temperature range (e.g., 600° C. to 1,100° C., particularly 700° C. to 1,000° C.), whereas more pyrolyzed carbon (soot) is assumed to be predominant in the higher temperature range (e.g., 1,000° C.

to 1,400° C., particularly 1,100° C. to 1,400° C.). If the ceramic molded body is held in the lower temperature range for a predetermined period of time before being degreased at the maximum temperature, it is believed that the removal of residual carbon proceeds at a relatively high speed because an amorphous carbon generation reaction occurs in addition to the methanation reaction. In this lower temperature range, it is believed that a small amount of resin remains as soot with low reactivity, and the methanation of the residual soot requires further treatment in the higher temperature range. On the other hand, if the treatment in the higher temperature range is performed without holding the ceramic molded body in the lower temperature range, it is believed that most resin becomes soot with low reactivity, and the methanation of the soot requires a longer treatment time, particularly for thick shaped ceramic bodies.

Although the intermediate temperature may be set within a range of 600° C. to 1,100° C., the intermediate temperature is preferably set within a range of 700° C. to 1,000° C. to perform sufficient degreasing. The holding time at the intermediate temperature is preferably set to 1 hour or more. This is because a holding time of 1 hour or more results in sufficient degreasing. This time is preferably set to 2 hours or less. This is because a holding time of more than 2 hours does not make a significant difference in degreasing effect and is not economical.

The method for degreasing a ceramic molded body according to this embodiment is applicable to the manufacture of a ceramic fired body. That is, a ceramic fired body can be obtained by firing a ceramic molded body degreased by the above-described method for degreasing a ceramic molded body. Firing may be performed by a conventionally known method such as atmospheric-pressure firing or pressure firing (e.g., hot press firing or HIP firing). The firing atmosphere may be an air atmosphere or a nonoxidizing atmosphere (e.g., a nitrogen atmosphere or an argon atmosphere). The firing temperature and the firing time may be set as appropriate depending on the ceramic powder used.

EXAMPLES

Examples of the present invention will hereinafter be described. The following examples are not intended to limit the invention in any way.

Experimental Example 1

1. Fabrication of Shaped Ceramic Body (Shaping Step)

First, a ceramic slurry containing a ceramic powder, a dispersion medium, and a gelling agent (an isocyanate, a polyol, a dispersant, and a catalyst) was prepared. Specifically, a ceramic slurry was prepared by mixing together 100 parts by mass of an aluminum nitride powder, serving as a ceramic powder, 30 parts by mass of a mixture of an aliphatic polyvalent ester and a polybasic acid ester, serving as a dispersion medium, and, as a gelling agent, 5.3 parts by mass of 4'4-diphenylmethane diisocyanate, serving as an isocyanate, 0.3 parts by mass of ethylene glycol, serving as a polyol, 3 parts by mass of a polycarboxylic acid-based copolymer, serving as a dispersant, and 0.05 parts by mass of 6-dimethylamino-1-hexanol, serving as a catalyst.

Figure 4A:
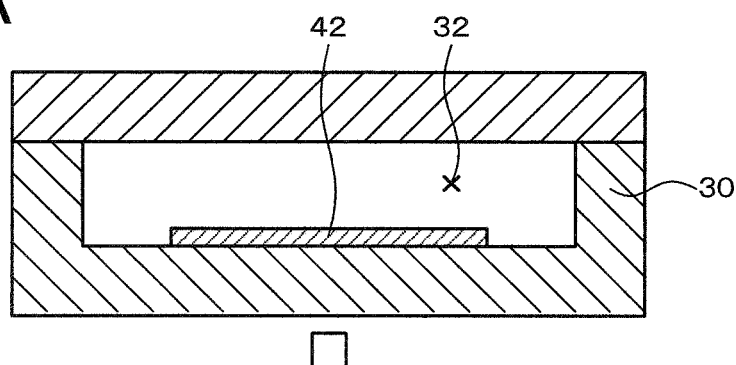
FIGS. 4A to 4D are illustrations of the steps of fabricating and heat-treating a ceramic molded body.
Figure 4A:
Figure 4B:
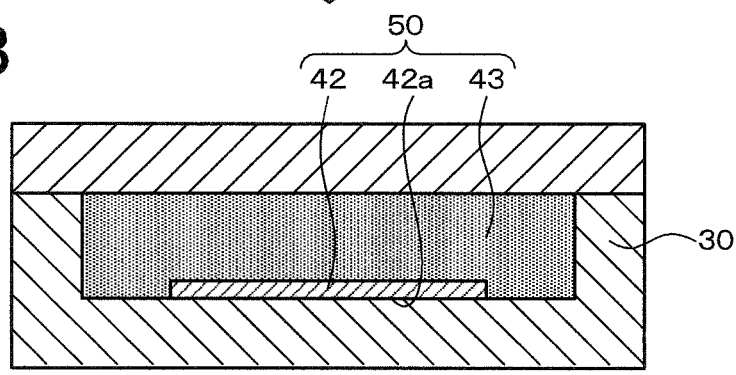
Figure 4B:
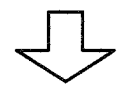

Next, as shown in FIG. 4A, the resulting ceramic slurry was poured under pressure through a slurry inlet (not shown) into an inner space 32 (slurry reservoir) of a mold 30. The inner space 32 had a length of 50 mm, a width of 50 mm, and a height of 10 mm. A Ni plate 42 having a length of 30 mm, a width of 30 mm, and a thickness of 1 mm was mounted on the center of a surface (bottom surface) of the mold 30 having a length of 50 mm and a width of 50 mm. The pouring of the ceramic slurry was started immediately after the preparation of the ceramic slurry. The pouring of the ceramic slurry was continued until the ceramic slurry filled the inner space 32. The ceramic slurry was then allowed to stand at room temperature to undergo gelation for 2 hours while being maintained under pressure so as not to flow back. As shown in FIG. 4B, a ceramic gel body 43 having the Ni plate 42 embedded therein (which will be referred to as "Ni-plate-embedded gel body 50") was fabricated. Gelation occurs when the isocyanate and the polyol react to form a urethane resin. The Ni-plate-embedded gel body 50 had one surface 42a of the Ni plate 42 flush with the back surface of the ceramic gel body 43 (the surface 42a exposed to the outside).

Figure 4C:
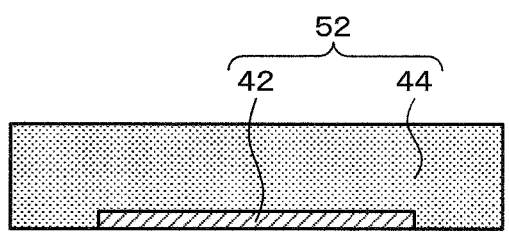
Figure 4C:
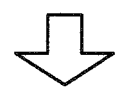

Next, the Ni-plate-embedded gel body 50 was dried at 80° C. in a nitrogen atmosphere for 24 hours. By this drying, the dispersion medium present in the ceramic gel body 43 was volatilized to reduce the dispersion medium content to 0.1% by mass or less. As shown in FIG. 4C, a ceramic molded body 44 having the Ni plate 42 embedded therein (which will be referred to as "Ni-plate-embedded molded body 52") was obtained. The ceramic molded body 44 was an aluminum nitride ceramic molded body containing about 5% by mass of a urethane resin as an organic binder and had a porosity of 42.1% by volume. The bulk density of the dried shaped body was measured, and the porosity was calculated by the following equation:

$$\text{Porosity (\% by volume)} = (1 - (\text{bulk density}/\text{true density})) \times 100$$

2. Heat Treatment of Shaped Ceramic Body (Degreasing Step)

Figure 4D:
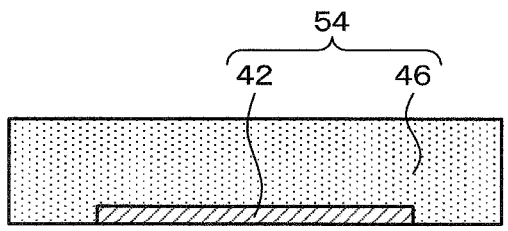

The Ni-plate-embedded molded body 52 was placed in a heating furnace. In a hydrogen atmosphere (100% by volume of hydrogen gas (excluding impurity gases incidentally mixed therein)), the Ni-plate-embedded molded body 52 was heated from room temperature (25° C.) to a maximum temperature of 1,100° C. at a heating rate of 200° C./h and was held at 1,100° C. for 1 hour. The Ni-plate-embedded molded body 52 was then cooled to 100° C. at a cooling rate of 200° C./h. The treatment time required from the start of heating to the end of cooling was slightly more than 11 hours. As shown in FIG. 4D, the heat-treated Ni-plate-embedded molded body 54 had the Ni plate 42 embedded in the degreased ceramic molded body 46 and had a residual carbon content of 0.05% by mass (the target value is 0.1% by mass or less) and a total oxygen content of 1.9% by mass (the target value is less than 2% by mass). These results demonstrate that degreasing was sufficiently performed and that substantially no aluminum nitride was oxidized. No crack was found when the appearance of the heat-treated Ni-plate-embedded molded body 54 was visually observed. In addition, no oxide film was formed on the surface of the Ni plate 42. Table 1 summarizes the results for Experimental Example 1. Table 1 also summarizes the results for Experimental Examples 2 to 9, described later.

Experimental Example 2

In Experimental Example 2, heat treatment was performed as in Experimental Example 1 except that, when the Ni-plate-embedded molded body 52 obtained in Experimental Example 1 was heat-treated, the maximum temperature was changed to 1,400° C. The treatment time was slightly more than 14 hours. The heat-treated Ni-plate-embedded molded body 54 had a residual carbon content of 0.03% by mass and a total oxygen content of 1.9% by mass. These results demonstrate that degreasing was sufficiently performed and that substantially no aluminum nitride was oxidized. No crack was found when the appearance of the heat-treated Ni-plate-embedded molded body 54 was visually observed. In addition, no oxide film was formed on the surface of the Ni plate 42.

Experimental Example 3

In Experimental Example 3, heat treatment was performed as in Experimental Example 1 except that, when the Ni-plate-embedded molded body 52 obtained in Experimental Example 1 was heat-treated, the atmosphere was changed to an atmosphere of a mixture of 20% by volume of hydrogen gas and 80% by volume of nitrogen gas, and the maximum temperature was changed to 1,400° C. The treatment time was slightly more than 14 hours. The heat-treated Ni-plate-embedded molded body 54 had a residual carbon content of 0.05% by mass and a total oxygen content of 1.9% by mass. These results demonstrate that degreasing was sufficiently performed and that substantially no aluminum nitride was oxidized. No crack was found when the appearance of the heat-treated Ni-plate-embedded molded body 54 was visually observed. In addition, no oxide film was formed on the surface of the Ni plate 42.

Experimental Example 4

In Experimental Example 4, heat treatment was performed as in Experimental Example 1 except that, when the Ni-plate-embedded molded body 52 obtained in Experimental Example 1 was heat-treated, the maximum temperature was changed to 1,000° C. The treatment time was slightly more than 10 hours. The heat-treated Ni-plate-embedded molded body 54 had a residual carbon content of 0.4% by mass and a total oxygen content of 1.9% by mass. No crack was found when the appearance of the heat-treated Ni-plate-embedded molded body 54 was visually observed. In addition, no oxide film was formed on the surface of the Ni plate 42. In Experimental Example 4, the shaped body had a high residual carbon content probably because the temperature during the heat treatment was too low and thus resulted in insufficient degreasing.

Experimental Example 5

In Experimental Example 5, heat treatment was performed as in Experimental Example 1 except that, when the Ni-plate-embedded molded body 52 obtained in Experimental Example 1 was heat-treated, the atmosphere was changed to an atmosphere of a mixture of 10% by volume of hydrogen gas and 90% by volume of nitrogen gas, and the maximum temperature was changed to 1,400° C. The treatment time was slightly more than 14 hours. The heat-treated Ni-plate-embedded molded body 54 had a residual carbon content of 0.06% by mass and a total oxygen content of 2% by mass. A crack was found when the appearance of the heat-treated Ni-plate-embedded molded body 54 was visually observed. In addition, no oxide film was formed on the surface of the Ni plate 42. In Experimental Example 5, the shaped body was cracked probably because the hydrogen gas concentration of the hydrogen atmosphere was too low and thus resulted in large temperature variation in the shaped body due to decreased thermal conductivity and diffusivity of the gas in combination with the high heating and cooling rates.

Experimental Example 6

In Experimental Example 6, heat treatment was performed as in Experimental Example 1 except that, when the Ni-plate-embedded molded body 52 obtained in Experimental Example 1 was heat-treated, the atmosphere was changed to 100% by volume of nitrogen gas, and the maximum temperature was changed to 1,400° C. The treatment time was slightly more than 14 hours. The heat-treated Ni-plate-embedded molded body 54 had a residual carbon content of 1% by mass and a total oxygen content of 2% by mass. A crack was found when the appearance of the heat-treated Ni-plate-embedded molded body 54 was visually observed. In addition, no oxide film was formed on the surface of the Ni plate 42. In Experimental Example 6, the shaped body was cracked and had a high residual carbon content probably because the heat treatment was performed in a nitrogen atmosphere and thus resulted in large temperature variation in the shaped body due to decreased thermal conductivity and diffusivity of the gas in combination with the high heating and cooling rates.

Experimental Example 7

In Experimental Example 7, heat treatment was performed as in Experimental Example 1 except that, when the Ni-plate-embedded molded body 52 obtained in Experimental Example 1 was heat-treated, the atmosphere was changed to 100% by volume of nitrogen gas, the maximum temperature was changed to 1,400° C., and the heating and cooling rates were changed to 10° C./h. The treatment time was slightly more than 268 hours. The heat-treated Ni-plate-embedded molded body 54 had a residual carbon content of 1% by mass and a total oxygen content of 2% by mass. No crack was found when the appearance of the heat-treated Ni-plate-embedded molded body 54 was visually observed. In addition, no oxide film was formed on the surface of the Ni plate 42. In Experimental Example 7, the shaped body had a high carbon content probably because the heat treatment was performed in a nitrogen atmosphere. On the other hand, the shaped body was not cracked because the heating and cooling rates were low and thus resulted in reduced temperature variation in the shaped body, although the treatment time was considerably long.

Experimental Example 8

In Experimental Example 8, heat treatment was performed as in Experimental Example 1 except that, when the Ni-plate-embedded molded body 52 obtained in Experimental Example 1 was heat-treated, the atmosphere was changed to air, the maximum temperature was changed to 450° C., and the heating and cooling rates were changed to 10° C./h. The treatment time was slightly more than 78 hours. The heat-treated Ni-plate-embedded molded body 54 had a residual carbon content of 0.03% by mass and a total oxygen content of 2% by mass. No crack was found when the appearance of the heat-treated Ni-plate-embedded molded body 54 was visually observed. In addition, no oxide film was formed on the surface of the Ni plate 42. In Experimental Example 8, the residual carbon content decreased sufficiently probably because the heat treatment was performed in an air atmosphere and thus facilitated removal of organic components by oxidation with oxygen in air. In addition, the shaped body was not cracked because the heating and cooling rates were low and thus resulted in reduced temperature variation in the shaped body, although the treatment time was long.

Experimental Example 9

In Experimental Example 9, heat treatment was performed as in Experimental Example 1 except that, when the Ni-plate-embedded molded body 52 obtained in Experimental Example 1 was heat-treated, the atmosphere was changed to air, the maximum temperature was changed to 600° C., and the heating and cooling rates were changed to 10° C./h. The treatment time was slightly more than 108 hours. The heat-treated Ni-plate-embedded molded body 54 had a residual carbon content of 0.03% by mass and a total oxygen content of 5% by mass. No crack was found when the appearance of the heat-treated Ni-plate-embedded molded body 54 was visually observed. In addition, an oxide film was formed on the surface of the Ni plate 42. In Experimental Example 9, the residual carbon content decreased sufficiently probably because the heat treatment was performed in an air atmosphere and thus facilitated removal of organic components by oxidation with oxygen in air. In addition, the shaped body was not cracked because the heating and cooling rates were low and thus resulted in reduced temperature variation in the shaped body, although the treatment time was long. In Experimental Example 9, the shaped body had a considerably high total oxygen content probably because the maximum temperature was higher than that in Experimental Example 8 and thus resulted in oxidation of aluminum nitride and the Ni surface with oxygen in air.

molded body, the ceramic molded body was first heated to an intermediate temperature of 700° C. at a heating rate of 200° C./h, was held at that temperature for 1 hour, was heated to a maximum temperature of 1,400° C. at a heating rate of 200° C./h, was held at that temperature for 1 hour, and was cooled to 100° C. at a cooling rate of 200° C./h. The treatment time was 15.375 hours. The heat-treated Ni-plate-embedded molded body 54 had a residual carbon content of 0.06% by mass and a total oxygen content of 1.9% by mass. These results demonstrate that degreasing was sufficiently performed and that substantially no aluminum nitride was oxidized. No crack was found when the appearance of the heat-treated Ni-plate-embedded molded body 54 was visually observed. In addition, no oxide film was formed on the surface of the Ni plate 42. Table 2 summarizes the results for Experimental Example 10. Table 2 also summarizes the results for Experimental Examples 11 to 17, described later. The target value of the residual carbon content in Experimental Examples 10 to 17, in which the thickness of the ceramic gel body 43 was 20 mm, was set to 0.2% by mass or less.

TABLE 1

| | Experimental Example | | | | | | | | | Target value |
|---|---|---|---|---|---|---|---|---|---|---|
| | 1 | 2 | 3 | 4 | 5 | 6 | 7 | 8 | 9 | |
| Thickness of a ceramic gel[mm] | 10 | 10 | 10 | 10 | 10 | 10 | 10 | 10 | 10 | — |
| H2 gas concentration[vol. %] | 100 | 100 | 20 | 100 | 10 | 0 | 0 | Air | Air | |
| N2 gas concentration[vol. %] | 0 | 0 | 80 | 0 | 90 | 100 | 100 | | | |
| Maximum temperature[° C.] | 1100 | 1400 | 1400 | 1000 | 1400 | 1400 | 1400 | 450 | 600 | |
| Holding time at a maximum temperature[Hr.] | 1 | 1 | 1 | 1 | 1 | 1 | 1 | 1 | 1 | |
| Intermediate temperature[° C.] | — | — | — | — | — | — | — | — | — | |
| Holding time at a intermediate temperature[Hr.] | — | — | — | — | — | — | — | — | — | |
| Heating and cooling rates[° C./Hr.] | 200 | 200 | 200 | 200 | 200 | 200 | 10 | 10 | 10 | |
| Treatment time[Hr.] | 11.375 | 14.375 | 14.375 | 10.375 | 14.375 | 14.375 | 268.5 | 78.5 | 108.5 | |
| Residual carbon content after a treatment[mass %] | 0.05 | 0.03 | 0.05 | 0.4 | 0.06 | 1 | 1 | 0.03 | 0.03 | ≤0.1 |
| Total oxygen content after a treatment[mass %] | 1.9 | 1.9 | 1.9 | 1.9 | 2 | 2 | 2 | 2 | 5 | <2 |
| Sample appearance | No cracking | No cracking | No cracking | No cracking | Cracking | Cracking | No cracking | No cracking | No cracking | No cracking |
| Ni oxide film on a surface | Not formed | Not formed | Not formed | Not formed | Not formed | Not formed | Not formed | Not formed | Formed | Not formed |
| Judgement※ | OK | OK | OK | NG | NG | NG | NG | NG | NG | — |

※OK: Good, NG: Bad

Experimental Example 10

In Experimental Example 10, an experiment was performed as in Experimental Example 2 except that the height (thickness) of the ceramic gel body 43 was changed from 10 mm to 20 mm, and the heat treatment of the ceramic molded body was changed. In the heat treatment of the ceramic

Experimental Example 11

In Experimental Example 11, an experiment was performed as in Experimental Example 10 except that the maximum temperature of the heat treatment of the ceramic molded body was changed to 1,100° C. The treatment time was 12.375 hours. The heat-treated Ni-plate-embedded molded body 54 had a residual carbon content of 0.08% by mass and a total oxygen content of 1.9% by mass. These results demonstrate that degreasing was sufficiently performed and that substantially no aluminum nitride was oxidized. No crack was found when the appearance of the heat-treated Ni-plate-embedded molded body 54 was visually observed. In addition, no oxide film was formed on the surface of the Ni plate 42.

Experimental Example 12

In Experimental Example 12, an experiment was performed as in Experimental Example 10 except that the intermediate temperature of the heat treatment of the ceramic molded body was changed to 1,000° C. The treatment time was 15.375 hours. The heat-treated Ni-plate-embedded molded body 54 had a residual carbon content of 0.03% by mass and a total oxygen content of 1.9% by mass. These results demonstrate that degreasing was sufficiently performed and that substantially no aluminum nitride was oxidized. No crack was found when the appearance of the heat-treated Ni-plate-embedded molded body 54 was visually observed. In addition, no oxide film was formed on the surface of the Ni plate 42.

Experimental Example 13

In Experimental Example 13, an experiment was performed as in Experimental Example 12 except that the atmosphere of the heat treatment of the ceramic molded body was changed to an atmosphere of a mixture of 20% by volume of hydrogen gas and 80% by volume of nitrogen gas. The treatment time was 15.375 hours. The heat-treated Ni-plate-embedded molded body 54 had a residual carbon content of 0.05% by mass and a total oxygen content of 1.9% by mass. These results demonstrate that degreasing was sufficiently performed and that substantially no aluminum nitride was oxidized. No crack was found when the appearance of the heat-treated Ni-plate-embedded molded body 54 was visually observed. In addition, no oxide film was formed on the surface of the Ni plate 42.

Experimental Example 14

In Experimental Example 14, an experiment was performed as in Experimental Example 10 except that the intermediate temperature of the heat treatment of the ceramic molded body was changed to 600° C. The treatment time was 15.375 hours. The heat-treated Ni-plate-embedded molded body 54 had a residual carbon content of 0.13% by mass and a total oxygen content of 1.9% by mass. These results demonstrate that degreasing was relatively well performed and that substantially no aluminum nitride was oxidized. No crack was found when the appearance of the heat-treated Ni-plate-embedded molded body 54 was visually observed. In addition, no oxide film was formed on the surface of the Ni plate 42. In Experimental Example 14, the residual carbon content increased as compared to Experimental Examples 10 to 13 (exceeded 0.1% by mass) probably because the intermediate temperature was too low, i.e., 600° C.

Experimental Example 15

In Experimental Example 15, an experiment was performed as in Experimental Example 10 except that the intermediate temperature of the heat treatment of the ceramic molded body was changed to 1,100° C. The treatment time was 15.375 hours. The heat-treated Ni-plate-embedded molded body 54 had a residual carbon content of 0.11% by mass and a total oxygen content of 1.9% by mass. These results demonstrate that degreasing was relatively well performed and that substantially no aluminum nitride was oxidized. No crack was found when the appearance of the heat-treated Ni-plate-embedded molded body 54 was visually observed. In addition, no oxide film was formed on the surface of the Ni plate 42. In Experimental Example 15, the residual carbon content increased as compared to Experimental Examples 10 to 13 (exceeded 0.1% by mass) probably because the intermediate temperature was too high, i.e., 1,100° C.

Experimental Example 16

In Experimental Example 16, an experiment was performed as in Experimental Example 2 except that the height of the ceramic gel body 43 was changed from 10 mm to 20 mm. The treatment time was 14.375 hours. The heat-treated Ni-plate-embedded molded body 54 had a residual carbon content of 0.2% by mass and a total oxygen content of 1.9% by mass. These results demonstrate that degreasing was relatively well performed and that substantially no aluminum nitride was oxidized. No crack was found when the appearance of the heat-treated Ni-plate-embedded molded body 54 was visually observed. In addition, no oxide film was formed on the surface of the Ni plate 42. In Experimental Example 16, the residual carbon content increased as compared to Experimental Example 2 (exceeded 0.1% by mass) probably because the ceramic gel body 43 had a large height (thickness), i.e., 20 mm.

Experimental Example 17

In Experimental Example 17, an experiment was performed as in Experimental Example 2 except that the height of the ceramic gel body 43 was changed from 10 mm to 20 mm, and the holding time at the maximum temperature was changed from 1 hour to 15 hours. The treatment time was 28.375 hours. The heat-treated Ni-plate-embedded molded body 54 had a residual carbon content of 0.03% by mass and a total oxygen content of 1.9% by mass. These results demonstrate that degreasing was sufficiently performed and that substantially no aluminum nitride was oxidized. No crack was found when the appearance of the heat-treated Ni-plate-embedded molded body 54 was visually observed. In addition, no oxide film was formed on the surface of the Ni plate 42. In Experimental Example 17, the residual carbon content was similar to that of Experimental Example 2, although the treatment time was longer. Nevertheless, the treatment time was shorter than that for air degreasing (e.g., as in Experimental Example 8). In Experimental Example 17, the treatment time was longer probably because the ceramic gel body 43 had a large height (thickness), i.e., 20 mm.

If the target value of the residual carbon content after the treatment is set to 0.1% by mass or less, the experimental examples that achieved the target value among Experimental Examples 10 to 17 are Experimental Examples 10 to 13 and 17.

TABLE 2

| | Experimental Example | | | | | | | | Target value |
|---|---|---|---|---|---|---|---|---|---|
| | 10 | 11 | 12 | 13 | 14 | 15 | 16 | 17 | |
| Thickness of a ceramic gel[mm] | 20 | 20 | 20 | 20 | 20 | 20 | 20 | 20 | — |
| H2 gas concentration[vol. %] | 100 | 100 | 100 | 20 | 100 | 100 | 100 | 100 | |
| N2 gas concentration[vol. %] | 0 | 0 | 0 | 80 | 0 | 0 | 0 | 0 | |
| Maximum temperature[° C.] | 1400 | 1100 | 1400 | 1400 | 1400 | 1400 | 1400 | 1400 | |
| Holding time at a maximum temperature[Hr.] | 1 | 1 | 1 | 1 | 1 | 1 | 1 | 15 | |
| Intermediate temperature[° C.] | 700 | 700 | 1000 | 1000 | 600 | 1100 | — | — | |
| Holding time at a intermediate temoerature[Hr.] | 1 | 1 | 1 | 1 | 1 | 1 | — | — | |
| Heating and cooling rates[° C./Hr.] | 200 | 200 | 200 | 200 | 200 | 200 | 200 | 200 | |
| Treatment time[Hr.] | 15.375 | 12.375 | 15.375 | 15.375 | 15.375 | 15.375 | 14.375 | 28.375 | |
| Residual carbon content after a treatment[mass %] | 0.06 | 0.08 | 0.03 | 0.05 | 0.13 | 0.11 | 0.2 | 0.03 | ≤0.2 |
| Total oxygen content after a treatment[mass %] | 1.9 | 1.9 | 1.9 | 1.9 | 1.9 | 1.9 | 1.9 | 1.9 | <2 |
| Sample appearance | No cracking | No cracking | No cracking | No cracking | No cracking | No cracking | No cracking | No cracking | No cracking |
| Ni oxide film on a surface | Not formed | Not formed | Not formed | Not formed | Not formed | Not formed | Not formed | Not formed | Not formed |
| Judgement※ | OK | OK | OK | OK | OK | OK | OK | OK | — |

※OK: Good, NG: Bad

Experimental Examples 1 to 3 and 10 to 17 correspond to examples of the present invention, whereas Experimental Examples 4 to 9 correspond to comparative examples.

The present invention contains subject matter related to Japanese Patent Application No. 2018-36703 filed on Mar. 1, 2018, the entire contents of which are incorporated herein by reference.

What is claimed is:

1. A method for degreasing a ceramic molded body, comprising degreasing a ceramic molded body including a ceramic powder and an organic binder,
   wherein the ceramic molded body includes an oxidizable ceramic powder as the ceramic powder, includes an oxidizable metal or metal compound, or is in contact with a solid body including an oxidizable metal or metal compound, and
   in an atmosphere of hydrogen gas alone or in an atmosphere of a mixture of an inert gas and hydrogen gas with a hydrogen gas concentration of 20% by volume or more, the ceramic molded body is heated to a maximum temperature set within a range of 1,100° C. to 1,400° C. at a heating rate of more than 25° C./h, is degreased at the maximum temperature, and is then cooled at a cooling rate of more than 25° C./h, and
   wherein the ceramic molded body is degreased without oxidizing the oxidizable ceramic powder and the oxidizable metal or metal compound, and without forming cracks in the ceramic molded body.

2. A method for degreasing a ceramic molded body, comprising degreasing a ceramic molded body including a ceramic powder and an organic binder,
   wherein the ceramic molded body includes an oxidizable ceramic powder as the ceramic powder, includes an oxidizable metal or metal compound, or is in contact with a solid body including an oxidizable metal or metal compound, and
   in an atmosphere of hydrogen gas alone or in an atmosphere of a mixture of an inert gas and hydrogen gas with a hydrogen gas concentration of 20% by volume or more, the ceramic molded body is heated to an intermediate temperature set within a range of 600° C. to 1,100° C. at a heating rate of more than 25° C./h, is held at the intermediate temperature for a predetermined period of time, is heated to a maximum temperature set above the intermediate temperature within a range of 1,100° C. to 1,400° C. at a heating rate of more than 25° C./h, is degreased at the maximum temperature, and is then cooled at a cooling rate of more than 25° C./h, and
   wherein the ceramic molded body is degreased without oxidizing the oxidizable ceramic powder and the oxidizable metal or metal compound, and without forming cracks in the ceramic molded body.

3. The method for degreasing a ceramic molded body according to claim 1,
   wherein the oxidizable ceramic powder is aluminum nitride, silicon nitride, or silicon carbide.

4. The method for degreasing a ceramic molded body according to claim 1,
   wherein the oxidizable metal is Ni, W, or Mo, and the oxidizable metal compound is WC or MoC.

5. The method for degreasing a ceramic molded body according to claim 1,
   wherein the heating and cooling rates are 50° C./h to 500° C./h.

6. The method for degreasing a ceramic molded body according to claim 1,
   wherein the ceramic molded body has a porosity of 20% by volume to 70% by volume.

7. A method for manufacturing a ceramic fired body, comprising:
   a degreasing step of degreasing a ceramic molded body including a ceramic powder and an organic binder; and
   a firing step of firing the degreased ceramic molded body,
   wherein the method for degreasing a ceramic molded body according to claim 1 is employed in the degreasing step.

8. The method for degreasing a ceramic molded body according to claim 2,
    wherein the oxidizable ceramic powder is aluminum nitride, silicon nitride, or silicon carbide.

9. The method for degreasing a ceramic molded body according to claim 2,
    wherein the oxidizable metal is Ni, W, or Mo, and the oxidizable metal compound is WC or MoC.

10. The method for degreasing a ceramic molded body according to claim 2,
    wherein the heating and cooling rates are 50° C./h to 500° C./h.

11. The method for degreasing a ceramic molded body according to claim 2,
    wherein the ceramic molded body has a porosity of 20% by volume to 70% by volume.

12. A method for manufacturing a ceramic fired body, comprising:
    a degreasing step of degreasing a ceramic molded body including a ceramic powder and an organic binder; and
    a firing step of firing the degreased ceramic molded body,
    wherein the method for degreasing a ceramic molded body according to claim 2 is employed in the degreasing step.

* * * * *